United States Patent
Misawa et al.

(10) Patent No.: US 10,498,170 B2
(45) Date of Patent: Dec. 3, 2019

(54) NON-CONTACT ELECTRIC POWER TRANSMITTING DEVICE AND ELECTRIC POWER TRANSFER SYSTEM

(71) Applicant: TOYOTA JIDOSHA KABUSHIKI KAISHA, Toyota-shi, Aichi-ken (JP)

(72) Inventors: Takahiro Misawa, Okazaki (JP); Yoshinobu Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 853 days.

(21) Appl. No.: 15/172,792

(22) Filed: Jun. 3, 2016

(65) Prior Publication Data

US 2016/0365752 A1 Dec. 15, 2016

(30) Foreign Application Priority Data

Jun. 10, 2015 (JP) .................................. 2015-117277

(51) Int. Cl.
  *H02J 50/12*  (2016.01)
  *H02J 7/02*   (2016.01)
  *H02J 3/18*   (2006.01)

(52) U.S. Cl.
  CPC ................ *H02J 50/12* (2016.02); *H02J 3/18* (2013.01); *H02J 7/025* (2013.01)

(58) Field of Classification Search
  CPC ............. H02J 5/005; H02J 7/025; H02J 7/027
  See application file for complete search history.

(56) References Cited

U.S. PATENT DOCUMENTS

| 6,301,128 | B1 | 10/2001 | Jang et al. |
| 2007/0205727 | A1 | 9/2007 | Tamita et al. |
| 2011/0222651 | A1 | 9/2011 | Ogawa et al. |
| 2013/0127409 | A1 | 5/2013 | Ichikawa |
| 2013/0193749 | A1 | 8/2013 | Nakamura et al. |
| 2013/0248520 | A1 | 9/2013 | Uchida et al. |
| 2015/0008877 | A1 | 1/2015 | Ichikawa et al. |
| 2016/0064951 | A1* | 3/2016 | Yamamoto ............... H02J 17/00 307/104 |

FOREIGN PATENT DOCUMENTS

| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-207795 A | 10/2014 |
| KR | 10-2013-0094841 A | 8/2013 |
| WO | 2010/053108 A1 | 5/2010 |
| WO | 2015/015771 A1 | 2/2015 |

* cited by examiner

*Primary Examiner* — Alfonso Perez Borroto
(74) *Attorney, Agent, or Firm* — Oliff PLC

(57) ABSTRACT

A non-contact electric power transmitting device includes an electronic control unit configured to perform; i) a first control that controls a transmitted electric power to a target electric power by adjusting a duty cycle of an output voltage of an inverter, ii) a second control that controls a turn-on current representing an output current of the inverter by adjusting a drive frequency, the output current being an output current at a time when the output voltage rises, and iii) adjusting the duty and the drive frequency such that a current supplied from the inverter to an electric power transmitting unit decreases within the range in which the turn-on current is smaller than or equal to a limit value, while performing the first control.

4 Claims, 11 Drawing Sheets

NON-CONTACT ELECTRIC POWER TRANSMITTING DEVICE AND ELECTRIC POWER TRANSFER SYSTEM

The disclosure of Japanese Patent Application No. 2015-117277 filed on Jun. 10, 2015 including the specification, drawings and abstract is incorporated herein by reference in its entirety.

BACKGROUND

1. Technical Field

This disclosure relates to a non-contact electric power transmitting device and an electric power transfer system, and more particularly, to an electric power control technology in a non-contact electric power transmitting device that transmits electric power to an electric power receiving device in a non-contact manner.

2. Description of Related Art

Japanese Patent Application Publication No. 2014-207795 (JP 2014-207795 A) discloses a non-contact electric power feed system that feeds electric power from an electric power feeding device (an electric power transmitting device) to a vehicle (an electric power receiving device) in a non-contact manner. With this non-contact electric power feed system, the electric power feeding device is equipped with an electric power transmitting coil, an inverter and an electronic control unit. The electric power transmitting coil transmits electric power in a non-contact manner to an electric power receiving coil that is mounted in the vehicle. The inverter generates an AC current corresponding to a drive frequency, and outputs the generated AC current to the electric power transmitting coil. The electronic control unit acquires a charging electric power command to supply electric power to a battery and an output electric power to be supplied to the battery from the vehicle side, and performs feedback control of the drive frequency of the inverter such that the output electric power follows the charging electric power command.

Then, in this non-contact electric power feed system, when the supply of electric power from the electric power feeding device to the vehicle is started, an initial frequency is set based on a state of the battery and a coupling coefficient between the coils (the electric power transmitting coil and the electric power receiving coil). The aforementioned feedback control is started using the initial frequency as an initial value of the drive frequency (see Japanese Patent Application Publication No. 2014-207795 (JP 2014-207795 A)).

In the case where the inverter is a voltage-type inverter and supplies a transmitted electric power (i.e. an electric power to be transmitted to the electric power receiving device) corresponding to the drive frequency to an electric power transmitting unit, the transmitted electric power can be controlled by adjusting the duty cycle of an output voltage of the inverter. In addition, a turn-on current representing an output current of the inverter at the time when the output voltage of the inverter rises can be controlled by controlling the drive frequency of the inverter.

In the voltage-type inverter, it is known that when an output current having the same sign as an output voltage (a positive turn-on current) flows through the inverter as the output voltage rises, a recovery current flows through a recirculation diode of the inverter. When the recovery current flows through the recirculation diode, the recirculation diode generates heat and causes an increase in loss. Thus, the loss resulting from the recovery current can be kept small by controlling the drive frequency of the inverter to control the turn-on current to or below 0.

However, when the drive frequency of the inverter is changed to control the turn-on current, the frequency of the electric power transferred from the electric power transmitting unit (the electric power transmitting coil) to an electric power receiving unit (the electric power receiving coil) changes, and the efficiency of electric power transfer between the electric power transmitting unit and the electric power receiving unit may decrease.

SUMMARY

Therefore, it is an object of embodiments to enhance the efficiency of electric power transfer to an electric power receiving device within a range in which no recovery current is generated in an inverter, in a non-contact electric power transmitting device that transmits electric power to the electric power receiving device in a non-contact manner.

It is another object of embodiments to enhance the efficiency of electric power transfer between an electric power transmitting device and an electric power receiving device within a range in which no recovery current is generated in an inverter, in an electric power transfer system that transmits electric power from the electric power transmitting device to the electric power receiving device in a non-contact manner.

According to embodiments, a non-contact electric power transmitting device has an electric power transmitting unit, a voltage-type inverter, and an electronic control unit that controls the inverter. The electric power transmitting unit is configured to transmit an electric power to an electric power receiving device in a non-contact manner. The inverter supplies the transmitted electric power (i.e. an electric power to be transmitted to the electric power receiving device) having a drive frequency to the electric power transmitting unit. The electronic control unit performs first control and second control. The first control controls the transmitted electric power to a target electric power by adjusting a duty cycle of an output voltage of the inverter (transmitted electric power control). The second control controls a turn-on current representing an output current of the inverter at a time when the output voltage rises to a target value by adjusting the drive frequency of the inverter (turn-on current control). The target value is set within a range in which no recovery current is generated in a recirculation diode of the inverter. Moreover, the electronic control unit changes the target value of the turn-on current such that a current flowing through the electric power transmitting unit decreases within the range in which no recovery current is generated, while controlling the transmitted electric power to the target electric power through the first control.

The efficiency of electric power transfer between the electric power transmitting unit and the electric power receiving device is inversely proportional to the square of the current flowing through the electric power transmitting unit under the condition that the transmitted electric power is constant. Thus, the target value of the turn-on current is changed in the embodiments such that the current flowing through the electric power transmitting unit decreases within the range in which no recovery current is generated, while controlling the transmitted electric power to the target electric power through the first control. Consequently, the efficiency of electric power transfer can be enhanced within the range in which no recovery current is generated in the inverter.

Preferably, the electronic control unit changes the target value of the turn-on current such that the current flowing through the electric power transmitting unit is minimized within the range in which no recovery current is generated, while controlling the transmitted electric power to the target electric power through the first control.

By adopting this configuration, the efficiency of electric power transfer can be enhanced to the utmost while no recovery current is generated.

Preferably, the electronic control unit sets, in a case where there are two drive frequencies at which the turn-on current is a predetermined value equal to or smaller than a threshold under a condition that the transmitted electric power is constant, one of the two drive frequencies at which a magnitude of the current flowing through the electric power transmitting unit is smaller, as an initial adjusted value of the drive frequency in the second control, in executing a process of activating the inverter.

When the process of activating the inverter is executed, the drive frequency is adjusted to the aforementioned initial adjusted value. Then, the target value of the turn-on current is changed such that the current flowing through the electric power transmitting unit decreases, within the range in which no recovery current is generated. Thus, the current flowing through the electric power transmitting unit can be promptly reduced after the inverter is activated. Consequently, the efficiency of electric power transfer can be promptly enhanced within the range in which no recovery current is generated, after the inverter is activated.

According to embodiments, a non-contact electric power transmitting device has an electric power transmitting unit, a voltage-type inverter, and an electronic control unit that controls the inverter. The electric power transmitting unit is configured to transmit an electric power to an electric power receiving device in a non-contact manner. The inverter supplies the transmitted electric power having a drive frequency to the electric power transmitting unit. The electronic control unit performs first control and second control. The first control controls the transmitted electric power to a target electric power by adjusting a duty cycle of an output voltage of the inverter (transmitted electric power control). The second control controls a turn-on current representing an output current of the inverter at a time when the output voltage rises to a target value by adjusting the drive frequency of the inverter (turn-on current control). The target value is set within a range in which no recovery current is generated in a recirculation diode of the inverter. Moreover, the electronic control unit changes the target value of the turn-on current such that the output current of the inverter decreases within the range in which no recovery current is generated, while controlling the transmitted electric power to the target electric power through the first control.

As described above, the efficiency of electric power transfer between the electric power transmitting unit and the electric power receiving device is inversely proportional to the square of the current flowing through the electric power transmitting unit under the condition that the transmitted electric power is constant. Thus, the target value of the turn-on current is changed such that the output current of the inverter, which is closely correlated with the current flowing through the electric power transmitting unit, decreases within the range in which no recovery current is generated, while controlling the transmitted electric power to the target electric power through the first control. Consequently, the efficiency of electric power transfer can be enhanced within the range in which no recovery current is generated in the inverter.

Preferably, the electronic control unit changes the target value of the turn-on current such that the output current of the inverter is minimized within the range in which no recovery current is generated, while controlling the transmitted electric power to the target electric power through the first control.

By adopting this configuration, the efficiency of electric power transfer can be enhanced to the utmost while no recovery current is generated.

Preferably, the electronic control unit sets, in a case where there are two drive frequencies at which the turn-on current is a predetermined value equal to or smaller than a threshold under a condition that the transmitted electric power is constant, one of the two drive frequencies at which a magnitude of the output current of the inverter is smaller, as an initial adjusted value of the drive frequency in the second control, in executing a process of activating the inverter.

When the process of activating the inverter is executed, the drive frequency is adjusted to the aforementioned initial adjusted value. Then, the target value of the turn-on current is changed such that the output current of the inverter decreases, within the range in which no recovery current is generated. Thus, the output current of the inverter can be promptly reduced after the inverter is activated. Consequently, the efficiency of electric power transfer can be promptly enhanced within the range in which no recovery current is generated, after the inverter is activated.

According to embodiments, an electric power transfer system has an electric power transmitting device and an electric power receiving device. The electric power transmitting device has an electric power transmitting unit, a voltage-type inverter and an electronic control unit that controls the inverter. The electric power transmitting unit is configured to transmit an electric power to the electric power receiving device in a non-contact manner. The inverter supplies the transmitted electric power having a drive frequency to the electric power transmitting unit. The electronic control unit performs first control and second control. The first control controls the transmitted electric power to a target electric power by adjusting a duty cycle of an output voltage of the inverter (transmitted electric power control). The second control controls a turn-on current representing an output current of the inverter at a time when the output voltage rises to a target value by adjusting the drive frequency of the inverter (turn-on current control). The target value is set within a range in which no recovery current is generated in a recirculation diode of the inverter. Moreover, the electronic control unit changes the target value of the turn-on current such that a current flowing through the electric power transmitting unit decreases within the range in which no recovery current is generated, while controlling the transmitted electric power to the target electric power through the first control.

By adopting this configuration, the efficiency of electric power transfer can be enhanced within the range in which no recovery current is generated in the inverter.

Preferably, the electronic control unit changes the target value of the turn-on current such that the current flowing through the electric power transmitting unit is minimized within the range in which no recovery current is generated, while controlling the transmitted electric power to the target electric power through the first control.

By adopting this configuration, the efficiency of electric power transfer can be enhanced to the utmost while no recovery current is generated.

Preferably, the electronic control unit sets, in a case where there are two drive frequencies at which the turn-on current is a predetermined value equal to or smaller than a threshold under a condition that the transmitted electric power is constant, one of the two drive frequencies at which a magnitude of the current flowing through the electric power transmitting unit is smaller, as an initial adjusted value of the drive frequency in the second control, in executing a process of activating the inverter.

By adopting this configuration, the current flowing through the electric power transmitting unit can be promptly reduced after the inverter is activated. Consequently, the efficiency of electric power transfer can be promptly enhanced within the range in which no recovery current is generated, after the inverter is activated.

According to embodiments, an electric power transfer system has an electric power transmitting device and an electric power receiving device. The electric power transmitting device has an electric power transmitting unit, a voltage-type inverter and an electronic control unit that controls the inverter. The electric power transmitting unit is configured to transmit an electric power to the electric power receiving device in a non-contact manner. The inverter supplies the transmitted electric power having a drive frequency to the electric power transmitting unit. The electronic control unit performs first control and second control. The first control controls the transmitted electric power to a target electric power by adjusting a duty cycle of an output voltage of the inverter (transmitted electric power control). The second control controls a turn-on current representing an output current of the inverter at a time when the output voltage rises to a target value by adjusting the drive frequency of the inverter (turn-on current control). The target value is set within a range in which no recovery current is generated in a recirculation diode of the inverter. Moreover, the electronic control unit changes the target value of the turn-on current such that the output current of the inverter decreases, within the range in which no recovery current is generated, while controlling the transmitted electric power to the target electric power through the first control.

By adopting this configuration, the efficiency of electric power transfer can be enhanced within the range in which no recovery current is generated in the inverter.

Preferably, the electronic control unit changes the target value such that the output current of the inverter is minimized, within the range in which no recovery current is generated, while controlling the transmitted electric power to the target electric power through the first control.

By adopting this configuration, the efficiency of electric power transfer can be enhanced to the utmost while no recovery current is generated.

Preferably, the electronic control unit sets, in a case where there are two drive frequencies at which the turn-on current is a predetermined value equal to or smaller than a threshold under a condition that the transmitted electric power is constant, one of the two drive frequencies at which a magnitude of the output current of the inverter is smaller, as an initial adjusted value of the drive frequency in the second control, in executing a process of activating the inverter.

By adopting this configuration, the output current of the inverter can be promptly reduced after the inverter is activated. Consequently, the efficiency of electric power transfer can be promptly enhanced within the range in which no recovery current is generated, after the inverter is activated.

In each of the aforementioned embodiments, as the range in which no recovery current is generated in the recirculation diode of the inverter, the target value of the turn-on current may be set to, for example, a predetermined value equal to or smaller than 0.

According to embodiments, in the non-contact electric power transmitting device that transmits electric power to the electric power receiving device in a non-contact manner, the efficiency of electric power transfer to the electric power receiving device can be enhanced within the range in which no recovery current is generated in the inverter.

In the electric power transfer system that transmits electric power from the electric power transmitting device to the electric power receiving device, the efficiency of electric power transfer between the electric power transmitting device and the electric power receiving device can be enhanced within the range in which no recovery current is generated in the inverter.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
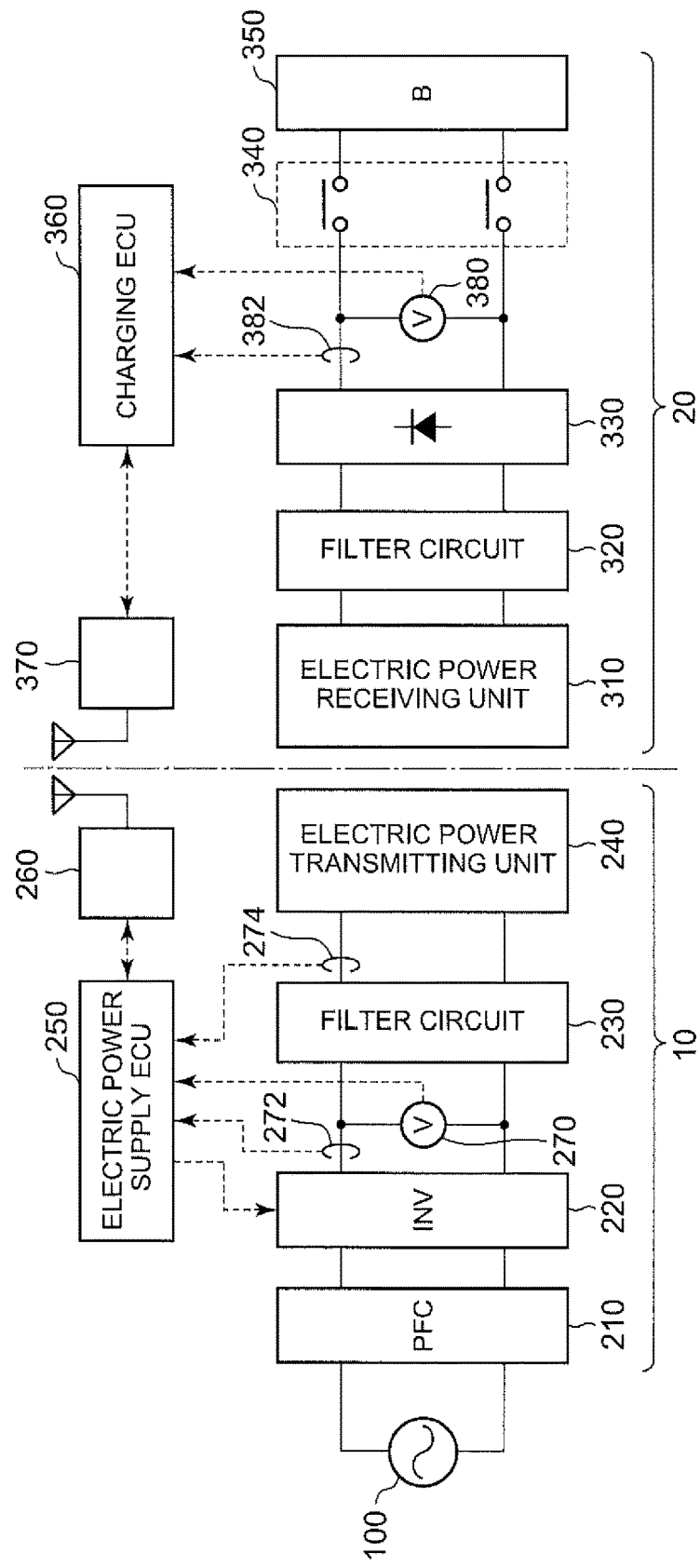
FIG. 1 is a general configuration diagram of an electric power transfer system to which a non-contact electric power transmitting device according to a first embodiment is applied.

Embodiments will be described hereinafter in detail with reference to the drawings. Although a plurality of embodiments will be described hereinafter, appropriate combinations of the configurations described in the respective embodiments are contemplated. Incidentally, like or equivalent components or parts are denoted by like reference symbols in the drawings, and the description thereof will not be repeated.

[First Embodiment] FIG. 1 is a general configuration diagram of an electric transfer system to which a non-contact electric power transmitting device according to the first embodiment is applied. Referring to FIG. 1, this electric power transfer system is equipped with an electric power transmitting device 10 and an electric power receiving device 20. The electric power receiving device 20 can be mounted in, for example, a vehicle or the like that can run using the electric power that is supplied from the electric power transmitting device 10 and stored.

The electric power transmitting device 10 includes a power factor correction (PFC) circuit 210, an inverter 220, a filter circuit 230, and an electric power transmitting unit 240. The electric power transmitting device 10 further includes an electric power supply electronic control unit (ECU) 250, a communication unit 260, a voltage sensor 270, and current sensors 272 and 274.

The PFC circuit 210 rectifies and boosts an AC electric power received from an AC electric power supply 100 (e.g., a system electric power supply), supplies this electric power as DC electric power to the inverter 220, and makes an input current closer to a sinusoidal wave, thus making it possible to improve the power factor. Various known PFC circuits can be adopted as this PFC circuit 210. Incidentally, a rectifier that does not have the function of improving the power factor may be adopted instead of the PFC circuit 210.

The inverter 220 converts a DC electric power received from the PFC circuit 210 into a transmitted electric power (an alternating current) having a predetermined transfer frequency. The transmitted electric power generated by the inverter 220 is supplied to the electric power transmitting unit 240 through the filter circuit 230. The inverter 220 is a voltage-type inverter, and recirculation diodes are connected in inverse-parallel to switching elements constituting the inverter 220, respectively. The inverter 220 is constituted by, for example, a single-phase full-bridge circuit.

The filter circuit 230 is provided between the inverter 220 and the electric power transmitting unit 240, and suppresses the harmonic noise generated from the inverter 220. The filter circuit 230 is constituted by, for example, an LC filter that includes an inductor and a capacitor.

The electric power transmitting unit 240 receives an AC electric power (a transmitted electric power) having a transfer frequency from the inverter 220 through the filter circuit 230, and transmits this AC electric power to an electric power receiving unit 310 of the electric power receiving device 20 in a non-contact manner through an electromagnetic field that is generated around the electric power transmitting unit 240. The electric power transmitting unit 240 includes, for example, a resonance circuit for transmitting electric power to the electric power receiving unit 310 in a non-contact manner. The resonance circuit can be constituted of a coil and a capacitor. However, in the case where a desired resonant state is formed only by the coil, there is no need to provide the capacitor.

The voltage sensor 270 detects an output voltage of the inverter 220, and outputs the detected value to the electric power supply ECU 250. The current sensor 272 detects an output current of the inverter 220, and outputs the detected value to the electric power supply ECU 250. A transmitted electric power that is supplied from the inverter 220 to the electric power transmitting unit 240 (i.e., an electric power that is output from the electric power transmitting unit 240 to the electric power receiving device 20) can be detected based on the detected values of the voltage sensor 270 and the current sensor 272. The current sensor 274 detects a current flowing through the electric power transmitting unit 240, and outputs the detected value to the electric power supply ECU 250.

The electric power supply ECU 250 includes a central processing unit (a CPU) (not shown), a storage device (memory) (not shown), input/output buffers (not shown) and the like. The electric power supply ECU 250 receives signals from various sensors and pieces of equipment, and performs the control of various pieces of equipment in the electric power transmitting device 10. For instance, the electric power supply ECU 250 performs switching control of the inverter 220 such that the inverter 220 generates a transmitted electric power (an alternating current), in executing electric power transfer from the electric power transmitting device 10 to the electric power receiving device 20. Various kinds of control are not limited to software-based processes, but can also be processed by dedicated pieces of hardware (electronic circuits).

As main control performed by the electric power supply ECU 250, the electric power supply ECU 250 performs feedback control (hereinafter referred to also as "transmitted electric power control") for controlling the transmitted electric power to a target electric power, in executing electric power transfer from the electric power transmitting device 10 to the electric power receiving device 20. In concrete terms, the electric power supply ECU 250 controls the transmitted electric power to the target electric power by adjusting the duty cycle of the output voltage of the inverter 220. Incidentally, the duty cycle of the output voltage is defined as the ratio of a positive (or negative) voltage output time to a cycle of an output voltage waveform (a rectangular wave). The duty cycle of the output voltage of the inverter can be adjusted by changing the timings for operating the switching elements (with an on/off duty cycle of 0.5) of the inverter 220. The target electric power can be generated based on, for example, an electric power receiving situation of the electric power receiving device 20. In this first embodiment, the target electric power of the transmitted electric power is generated based on a deviation between a target value of a received electric power and a detected value of the received electric power in the electric power receiving device 20, and is transmitted from the electric power receiving device 20 to the electric power transmitting device 10.

The electric power supply ECU 250 performs the aforementioned transmitted electric power control, and performs feedback control (hereinafter referred to also as "turn-on current control") for controlling the turn-on current in the inverter 220 to a target value. The turn-on current is an instantaneous value of the output current of the inverter 220 at the time when the output voltage of the inverter 220 rises. When the turn-on current is positive, a recovery current flows through the recirculation diodes of the inverter 220 in the opposite direction. As a result, heat generation, namely, a loss occurs in the recirculation diodes. Thus, the aforementioned target value of turn-on current control (a turn-on current target value) is set within a range in which no recovery current is generated in the recirculation diodes of the inverter 220, and is basically set to a predetermined value equal to or smaller than a limit value. Basically, the limit value may be 0 (although the value of "0" leading to a good power factor is ideal, the target value may be set to a negative value with a certain margin, or may be set to a positive value that is small enough to neglect the problem of a loss resulting from a recovery current).

Furthermore, in the electric power transmitting device 10 according to this first embodiment, with a view to enhancing the efficiency of electric power transfer between the electric power transmitting unit 240 and the electric power receiving unit 310 of the electric power receiving device 20, the target value of the turn-on current is changed such that the current flowing through the electric power transmitting unit 240 decreases, within a range in which no recovery current is generated. This turn-on current control and the aforementioned transmitted electric power control will be described later in detail.

The communication unit 260 is configured to establish wireless communication with the communication unit 370 of the electric power receiving device 20. In addition to receiving the target value of the transmitted electric power (a target electric power) transmitted from the electric power receiving device 20, the communication unit 260 exchanges pieces of information on the start/stop of electric power transmission, the electric power receiving situation of the electric power receiving device 20 and the like, with the electric power receiving device 20.

The electric power receiving device 20 includes the electric power receiving unit 310, a filter circuit 320, a rectification unit 330, a relay circuit 340, and an electrical storage device 350. The electric power receiving device 20 further includes a charging ECU 360, a communication unit 370, a voltage sensor 380, and a current sensor 382.

The electric power receiving unit 310 receives an electric power (an alternating current) output from the electric power transmitting unit 240 of the electric power transmitting device 10, in a non-contact manner. The electric power receiving unit 310 includes, for example, a resonance circuit for receiving an electric power from the electric power transmitting unit 240 in a non-contact manner. The resonance circuit can be constituted of a coil and a capacitor. However, in the case where a desired resonant state is formed only by the coil, there is no need to provide the capacitor. The electric power receiving unit 310 outputs the received electric power to the rectification unit 330 through the filter circuit 320.

The filter circuit 320 is provided between the electric power receiving unit 310 and the rectification unit 330, and suppresses the harmonic noise that is generated when an electric power is received. The filter circuit 320 is constituted by, for example, an LC filter that includes an inductor and a capacitor. The rectification unit 330 rectifies the AC electric power received by the electric power receiving unit 310, and outputs the rectified AC electric power to the electrical storage device 350.

The electrical storage device 350 is a rechargeable DC electric power supply, and is constituted by for example, a secondary battery such as a lithium-ion battery, a nickel hydride battery or the like. The electrical storage device 350 stores the electric power output from the rectification unit 330. Then, the electrical storage device 350 supplies the stored electric power to a load driving device (not shown) and the like. Incidentally, a large-capacity capacitor can also be adopted as the electrical storage device 350.

The relay circuit 340 is provided between the rectification unit 330 and the electrical storage device 350, and is turned on when the electrical storage device 350 is charged by the electric power transmitting device 10. Although not shown in the drawing in particular, a DC/DC converter that adjusts the output voltage of the rectification unit 330 may be provided between the rectification unit 330 and the electrical storage device 350 (e.g., between the rectification unit 330 and the relay circuit 340).

The voltage sensor 380 detects an output voltage of the rectification unit 330 (a received voltage), and outputs the detected value to the charging ECU 360. The current sensor 382 detects an output current from the rectification unit 330 (a received current), and outputs the detected value to the charging ECU 360. An electric power received by the electric power receiving unit 310 (i.e., an electric power with which the electrical storage device 350 is charged) can be detected based on the detected values of the voltage sensor 380 and the current sensor 382. The voltage sensor 380 and the current sensor 382 may be provided between the electric power receiving unit 310 and the rectification unit 330 (e.g., between the filter circuit 320 and the rectification unit 330).

The charging ECU 360 includes a CPU (not shown), a storage device (memory) (not shown), input/output buffers (not shown) and the like. The charging ECU 360 receives signals from various sensors and pieces of equipment, and performs the control of various pieces of equipment in the electric power receiving device 20. Various kinds of control are not limited to software-based processes, but can also be processed by dedicated pieces of hardware (electronic circuits).

As main control performed by the charging ECU 360, the charging ECU 360 generates a target value of the transmitted electric power (a target electric power) to be generated in the electric power transmitting device 10 such that the received electric power in the electric power receiving device 20 becomes equal to a desired target value, while receiving an electric power from the electric power transmitting device 10. In concrete terms, the charging ECU 360 generates the target value of the transmitted electric power to be generated in the electric power transmitting device 10 based on a deviation between a detected value of the received electric power and the target value of the received electric power. Then, the charging ECU 360 transmits the generated target value of the transmitted electric power (a target electric power) to the electric power transmitting device 10 by means of the communication unit 370.

The communication unit 370 is configured to establish wireless communication with the communication unit 260 of the electric power transmitting device 10. In addition to transmitting the target value of the transmitted electric power (the target electric power) generated in the charging ECU 360 to the electric power transmitting device 10, the communication unit 370 exchanges information on the start/stop of electric power transfer with the electric power transmitting device 10, and transmits the electric power receiving situation of the electric power receiving device 20 (the received voltage, the received current, the received electric power and the like) to the electric power transmitting device 10.

Figure 2:
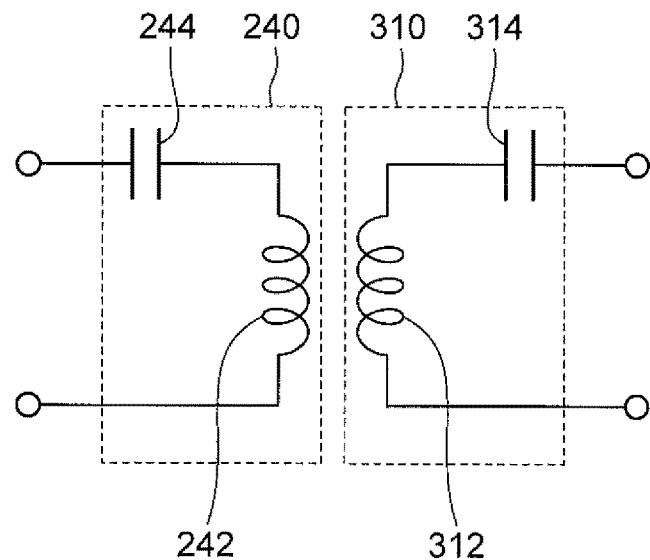
FIG. 2 is a view showing an exemplary circuit configuration of an electric power transmitting unit and an electric power receiving unit shown in FIG. 1.

FIG. 2 is a view showing an exemplary circuit configuration of the electric power transmitting unit 240 and the electric power receiving unit 310 shown in FIG. 1. Referring to FIG. 2, the electric power transmitting unit 240 includes a coil 242 and a capacitor 244. The capacitor 244 is provided to compensate for the power factor of the transmitted electric power, and is connected in series to the coil 242. The electric power receiving unit 310 includes a coil 312 and a capacitor 314. The capacitor 314 is provided to compensate for the power factor of the received electric power, and is connected in series to the coil 312. This circuit configuration is referred to also as an SS system (a primary series, secondary series system).

Although not shown in the drawing in particular, the electric power transmitting unit 240 and the electric power receiving unit 310 are not absolutely required to have this SS-type configuration. For example, an SP system (a primary series, secondary parallel system) in which the capacitor 314 is connected in parallel to the coil 312 can also be adopted in the electric power receiving unit 310. Furthermore, a PP system (a primary parallel, secondary parallel system) in which the capacitor 244 is connected in parallel to the coil 242, or the like can also be adopted in the electric power transmitting unit 240.

Referring again to FIG. 1, in this electric power transfer system, a transmitted electric power (an alternating current) is supplied from the inverter 220 to the electric power transmitting unit 240 through the filter circuit 230. Each of the electric power transmitting unit 240 and the electric power receiving unit 310 includes a coil and a capacitor, and is designed to resonate at a transfer frequency. It is preferable that a Q-value representing the resonance strength of each of the electric power transmitting unit 240 and the electric power receiving unit 310 be equal to or larger than 100.

In the electric power transmitting device 10, when the transmitted electric power is supplied from the inverter 220 to the electric power transmitting unit 240, an energy (an electric power) moves from the electric power transmitting unit 240 to the electric power receiving unit 310 through an electromagnetic field that is formed between the coil of the electric power transmitting unit 240 and the coil of the electric power receiving unit 310. The energy (the electric power) that has moved to the electric power receiving unit 310 is supplied to the electrical storage device 350 through the filter circuit 320 and the rectification unit 330.

Figure 3:
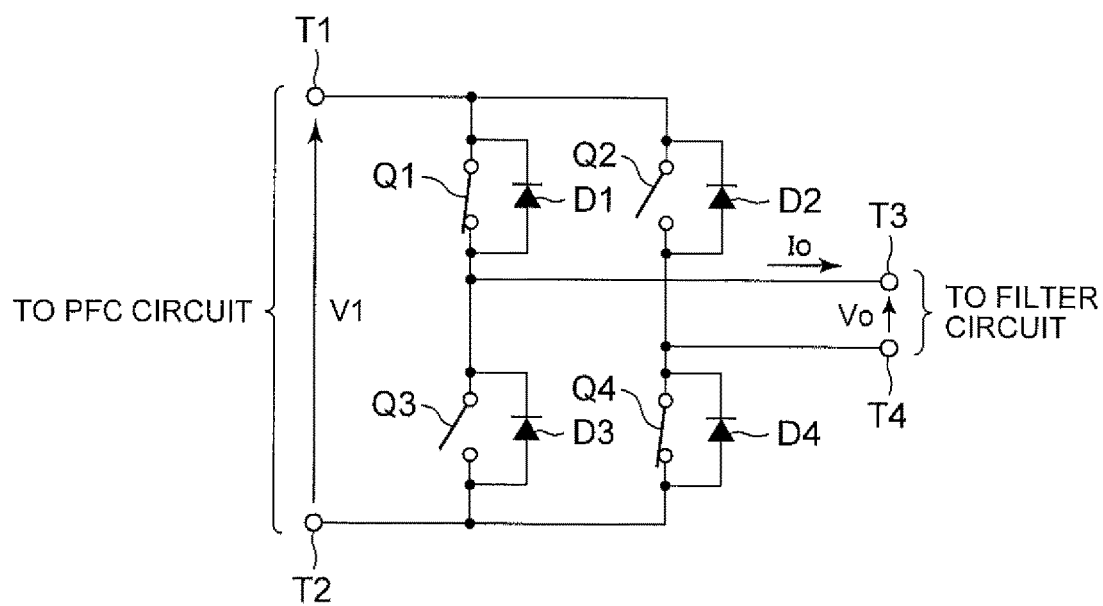
FIG. 3 is a view showing a circuit configuration of an inverter shown in FIG. 1.

FIG. 3 is a view showing a circuit configuration of the inverter 220 shown in FIG. 1. Referring to FIG. 3, the inverter 220 is a voltage-type inverter, and includes semiconductor switching elements for electric power (hereinafter referred to simply as "switching elements" as well) Q1 to Q4, and recirculation diodes D1 to D4. The PFC circuit 210 (FIG. 1) is connected to DC-side terminals T1 and T2, and the filter circuit 230 is connected to AC-side terminals T3 and T4.

The switching elements Q1 to Q4 are constituted by, for example, insulated gate bipolar transistors (IGBT's), bipolar transistors, metal oxide semiconductor field effect transistors (MOSFET's), gate turn-off thyristors (GTO's) or the like. The recirculation diodes D1 to D4 are connected in inverse-parallel to the switching elements Q1 to Q4 respectively.

A direct-current voltage V1 that is output from the PFC circuit 210 is applied between the terminals T1 and T2. Then, in accordance with switching operations of the switching elements Q1 to Q4, an output voltage Vo and an output current Io are generated between the terminals T3 and T4 (the directions indicated by arrows in the drawing are assumed to be a forward direction). This FIG. 3 shows, for instance, a state where the switching elements Q1 and Q4 are ON and the switching elements Q2 and Q3 are OFF. In this case, the output voltage Vo is approximately equal to a voltage V1 (a positive value).

Figure 4:
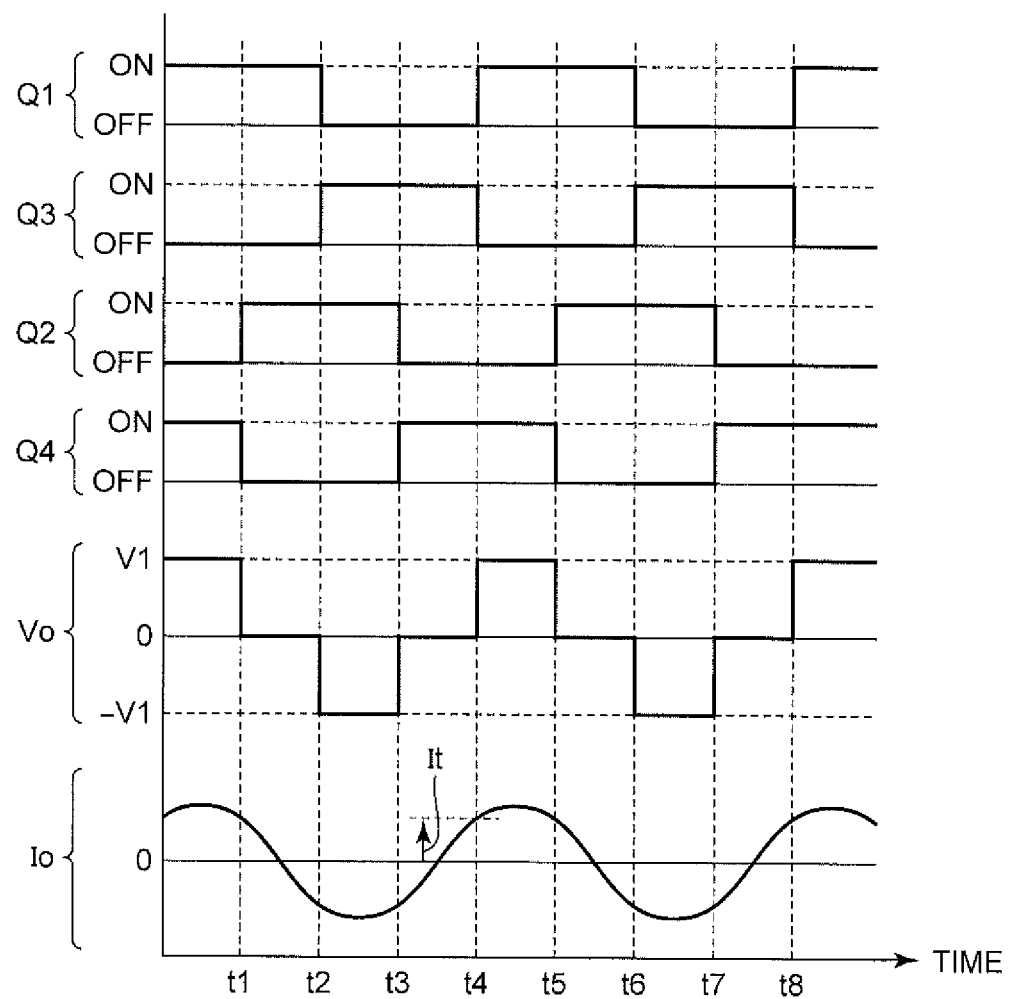
FIG. 4 is a view showing switching waveforms of the inverter and waveforms of output voltage and output current.

FIG. 4 is a view showing switching waveforms of the inverter 220 and waveforms of the output voltage Vo and the output current Io. Referring to FIG. 3 in conjunction with FIG. 4, one cycle from a time point t4 to a time point t8 will be described as an example. When the switching elements Q2 and Q4 are OFF and ON respectively, the switching element Q1 changes over from OFF to ON, and the switching element Q3 changes over from ON to OFF at the time point t4 (a state shown in FIG. 3), the output voltage Vo of the inverter 220 rises from 0 to V1 (the positive value).

When the switching elements Q1 and Q3 are ON and OFF respectively, the switching element Q2 changes over from OFF to ON, and the switching element Q4 changes over from ON to OFF at a time point t5, the output voltage Vo becomes equal to 0.

When the switching elements Q2 and Q4 are ON and OFF respectively, the switching element Q1 changes over from ON to OFF, and the switching element Q3 changes over from OFF to ON at a time point t6, the output voltage Vo becomes equal to −V1 (a negative value).

When the switching elements Q1 and Q3 are OFF and ON respectively, the switching element Q2 changes over from ON to OFF, and the switching element Q4 changes over from OFF to ON at a time point t7, the output voltage Vo becomes equal to 0 again.

Then, when the switching elements Q2 and Q4 are OFF and ON respectively, the switching element Q1 changes over from OFF to ON, and the switching element Q3 changes over from ON to OFF at the time point t8, that is, after the lapse of one cycle from the time point t4, the output voltage Vo rises from 0 to VI (the positive value) (the same state as at the time point t4).

This FIG. 4 shows a case where the duty cycle of the output voltage Vo is 0.25. Then, the duty cycle of the output voltage Vo can be changed by changing the timings for switching the switching elements Q1 and Q3 and the timings for switching the switching elements Q2 and Q4. For example, in the case shown in FIG. 4, the duty cycle of the output voltage Vo can be made smaller than 0.25 (the minimum value is 0) when the timings for switching the switching elements Q2 and Q4 are advanced, and the duty cycle of the output voltage Vo can be made larger than 0.25 (the maximum value is 0.5) when the timings for switching the switching elements Q2 and Q4 are retarded.

The transmitted electric power can be changed by adjusting the duty cycle of this output voltage Vo. Qualitatively, the transmitted electric power can be increased by increasing the duty cycle, and the transmitted electric power can be reduced by reducing the duty cycle. Thus, in this first embodiment, the electric power supply ECU 250 performs transmitted electric power control for controlling the transmitted electric power to the target electric power, by adjusting the duty cycle of the output voltage Vo.

An instantaneous value It of the output current Io at the time when the output voltage Vo rises (at the time point t4 or the time point t8) is equivalent to the aforementioned turn-on current. The value of this turn-on current It changes depending on the voltage V1 applied to the inverter 220 from the PFC circuit 210 and the drive frequency (the switching frequency) of the inverter 220. In the case shown herein, the positive turn-on current It flows.

When the positive turn-on current It flows, a current in the opposite direction, namely, a recovery current flows through the recirculation diode D3 (FIG. 3), which is connected in inverse-parallel to the switching element Q3. When the recovery current flows through the recirculation diode D3, the amount of heat generated by the recirculation diode D3 increases, and the loss in the inverter 220 increases. When the turn-on current It is equal to or smaller than 0, no recovery current flows through the recirculation diode D3, and the loss in the inverter 220 is kept small.

When the drive frequency (the switching frequency) of the inverter 220 changes, the turn-on current It changes. Therefore, the turn-on current It can be controlled by adjusting the drive frequency (the switching frequency) of the inverter 220. Thus, in this first embodiment, the electric power supply ECU 250 performs turn-on current control for controlling the turn-on current It to the target value, by adjusting the drive frequency (the switching frequency) of the inverter 220. Then, the target value of the turn-on current It is basically set to a value equal to or smaller than 0, so that no recovery current is generated in the inverter 220.

Figure 5:
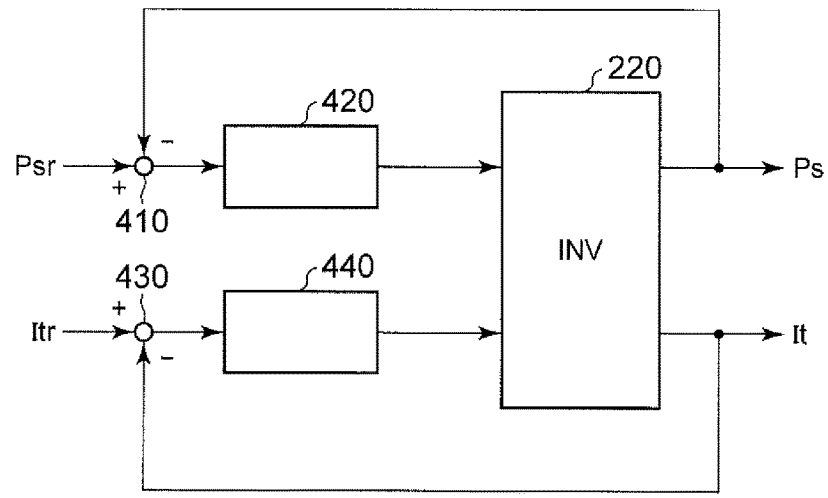
FIG. 5 is a control block diagram of transmitted electric power control and turn-on current control that are performed by an electric power supply ECU.

FIG. 5 is a control block diagram of transmitted electric power control and turn-on current control that are performed by the electric power supply ECU 250. Referring to FIG. 5, the electric power supply ECU 250 includes subtraction units 410 and 430 and controllers 420 and 440. A feedback loop that is constituted of the subtraction unit 410, the controller 420 and the inverter 220 to be controlled constitutes transmitted electric power control. On the other hand, a feedback loop that is constituted of the subtraction unit 430, the controller 440 and the inverter 220 constitutes turn-on current control.

The subtraction unit 410 subtracts a detected value of a transmitted electric power Ps from a target electric power Psr representing a target value of the transmitted electric power, and outputs the computed value to the controller 420. The detected value of the transmitted electric power Ps can be calculated based on, for example, detected values of the voltage sensor 270 and the current sensor 272 shown in FIG. 1.

The controller 420 generates a duty cycle command value of the output voltage Vo of the inverter 220, based on a deviation between the target electric power Psr and the transmitted electric power Ps. The controller 420 calculates an operation amount by performing proportional integral control (PI control) in which the deviation between the target electric power Psr and the transmitted electric power Ps is input, or the like, and sets the calculated operation amount as the duty cycle command value. Thus, the duty cycle of the output voltage Vo is adjusted such that the transmitted electric power Ps approaches the target electric power Psr, and the transmitted electric power Ps is controlled to the target electric power Psr.

On the other hand, the subtraction unit 430 subtracts a detected value of the turn-on current It from a target value Itr of the turn-on current, and outputs the computed value to the controller 440. The target value Itr of the turn-on current is basically set to a value equal to or smaller than 0 as described above. The detected value of the turn-on current It is a detected value (an instantaneous value) of the current sensor 272 (FIG. 1) at the time when the rising of the output voltage Vo is detected by the voltage sensor 270 (FIG. 1).

The controller 440 generates a drive frequency (switching frequency) command value of the inverter 220, based on a deviation between the target value Itr of the turn-on current and the turn-on current It. The controller 440 calculates an operation amount by, for example, performing PI control in which the deviation between the target value It of the turn-on current and the turn-on current It is input, or the like, and sets the calculated operation amount as the aforementioned frequency command value. Thus, the drive frequency of the inverter 220 is adjusted such that the turn-on current It approaches the target value Itr, and the turn-on current It is controlled to the target value Itr.

Transmitted electric power control for adjusting the duty cycle of the output voltage Vo of the inverter 220 and turn-on current control for adjusting the drive frequency of the inverter 220 interfere with each other. In some cases where the duty cycle adjusted through transmitted electric power control assumes a certain value, the turn-on current It cannot be controlled to the target value Itr through turn-on current control.

Figure 6:
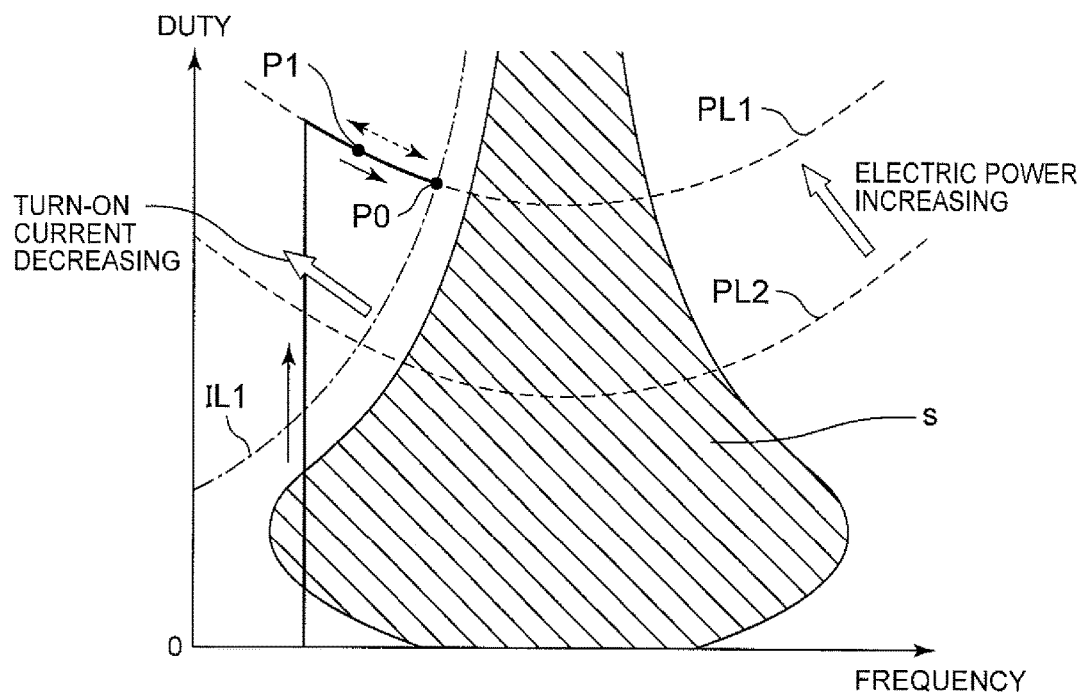
FIG. 6 is a view showing exemplary contour lines of transmitted electric power and turn-on current.

FIG. 6 is a view showing exemplary contour lines of the transmitted electric power Ps and the turn-on current It. Referring to FIG. 6, the axis of abscissa represents the drive frequency (the switching frequency) of the inverter 220, and the axis of ordinate represents the duty cycle of the output voltage Vo of the inverter 220.

Each of lines PL1 and PL2 indicated by dotted lines represents a contour line of the transmitted electric power Ps. The transmitted electric power represented by the line PL1 is larger than the transmitted electric power represented by the line PL2. As is apparent from the drawing, the duty cycle realizing a certain transmitted electric power is dependent on the frequency. Besides, a line IL1 indicated by an alternate long and short dash line represents a contour line of the turn-on current. The line IL1 shown in the drawing is a contour line on which the turn-on current is a predetermined value equal to or smaller than 0 (a contour line on which the turn-on current is 0 is shown as an example in this case). The turn-on current decreases (increases in the negative direction) as the duty cycle increases, and as the frequency decreases.

A region S indicated by hatched lines is a region in which a recovery current is generated in the inverter 220. That is, at an operating point of the inverter 220 included in the region S, the turn-on current is larger than 0, and a recovery current is generated in the inverter 220. This region S will be referred to hereinafter as "a prohibition zone S" as well. In this first embodiment, the border of the prohibition zone S does not coincide with the line on which the turn-on current is 0, but allows the turn-on current to assume a small positive value.

An operating point P0 is an initial target value of the operating point of the inverter 220 in executing a process of activating the inverter 220. That is, on the assumption that the lines PL1 and IL1 represent the target electric power Psr and the turn-on current target value Itr respectively, the inverter 220 is controlled to the operating point P0 as an intersection point of the lines PL1 and IL1 in the activation process thereof. As shown in the drawing, the prohibition zone S tends to be enlarged when the duty cycle is small. Thus, in this first embodiment, the operating point is shifted as indicated by a thick line, by increasing the gain of transmitted electric power control for adjusting the duty cycle etc., such that the operating point promptly passes through the prohibition zone S, when the inverter 220 is activated (when the transmitted electric power is raised with the duty cycle increasing from 0).

The aforementioned operating point P0 is an operating point that realizes the target electric power Psr within a range in which no recovery current is generated in the inverter 220. However, from the standpoint of the efficiency of electric power transfer between the electric power transmitting unit 240 (the electric power transmitting device 10) and the electric power receiving unit 310 (the electric power receiving device 20), the operating point P0 is not necessarily an appropriate operating point. That is, when the drive frequency of the inverter 220 is adjusted (changed) such that the inverter 220 operates at the operating point P0, the frequency of the electric power transferred from the electric power transmitting unit 240 to the electric power receiving unit 310 changes. As a result, the efficiency of electric power transfer between the electric power transmitting unit 240 and the electric power receiving unit 310 may decrease.

Thus, with the electric power transmitting device 10 according to this first embodiment, an operating point at which the efficiency of electric power transfer between the electric power transmitting unit 240 and the electric power receiving unit 310 can be enhanced is searched for, within a range in which no recovery current is generated in the inverter 220, while controlling the transmitted electric power Ps to the target electric power Psr through transmitted electric power control. The search for this operating point will be described hereinafter.

Figure 7:
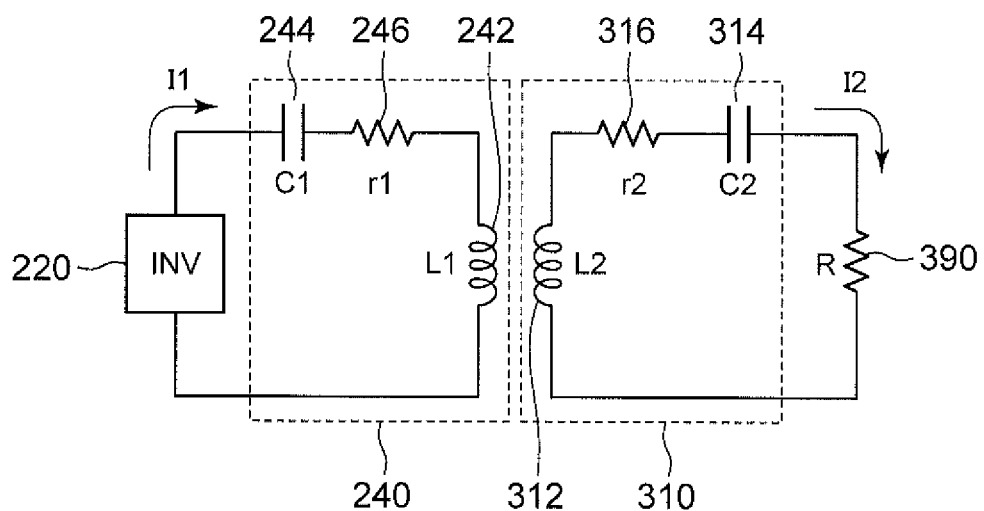
FIG. 7 is an equivalent circuit diagram for illustrating the efficiency of electric power transfer from the electric power transmitting unit to the electric power receiving unit.

FIG. 7 is an equivalent circuit diagram for illustrating the efficiency of electric power transfer from the electric power transmitting unit 240 to the electric power receiving unit 310. Referring to FIG. 7, in the electric power transmitting unit 240, it is assumed that the coil 242 has an inductance L1, and that the capacitor 244 has a capacitance C1. It is assumed that a resistance component 246 represents a winding resistance of the coil 242, and has a resistance value r1. In this equivalent circuit diagram, the filter circuit 230 (FIG. 1) of the electric power transmitting device 10 is omitted.

On the other hand, in the electric power receiving unit 310, it is assumed that the coil 312 has an inductance L2, and that the capacitor 314 has a capacitance C2. It is assumed that a resistance component 316 represents a winding resistance of the coil 312, and has a resistance value r2. A load 390 comprehensively represents a circuit starting from the filter circuit 320 (FIG. 1) in the electric power receiving device 20, and is assumed to have a resistance value R.

An efficiency η of electric power transfer between the coils 242 and 312 can be expressed as in an equation shown below, using these circuit constants.

$\eta = R/\{R+r2+r1 \, (|I1/I2|^2)\}$ ... (1) It should be noted herein that I1 represents a current flowing through the electric power transmitting unit 240, and that I2 represents a current flowing through the electric power receiving unit 310. If the received electric power is constant, the current I2 is substantially constant. Therefore, it is apparent from the equation (1) that the efficiency η of electric power transfer is inversely proportional to the square of the current I1.

Thus, in the electric power transmitting device 10 according to this first embodiment, an operating point of the inverter 220 is searched for such that the current I1 flowing through the electric power transmitting unit 240 decreases, within a range in which no recovery current is generated in the inverter 220, while controlling the transmitted electric power Ps to the target electric power Psr through transmitted electric power control. In concrete terms, the target value Itr (a negative value) of the turn-on current is changed (i.e., the drive frequency of the inverter 220 is adjusted) such that the current I1 decreases within a range in which no recovery current is generated, while enhancing the followability of the target electric power Psr by the transmitted electric power Ps by enhancing the gain of transmitted electric power control etc. Thus, the efficiency η of electric power transfer between the electric power transmitting unit 240 and the electric power receiving unit 310 can be enhanced within a range in which no recovery current is generated in the inverter 220, while controlling the transmitted electric power Ps to the target electric power Psr.

Preferably, an operating point of the inverter 220 is searched for such that the current I1 is minimized within a range in which no recovery current is generated, while controlling the transmitted electric power Ps to the target electric power Psr. In concrete terms, the target value Itr (the negative value) of the turn-on current is changed such that the current I1 is minimized within a range in which no recovery current is generated. Thus, the efficiency η of electric power transfer can be enhanced to the utmost within a range in which no recovery current is generated, while controlling the transmitted electric power Ps to the target electric power Psr. The word "minimized" mentioned herein means that the current I1 is minimized within such a range as not to exceed the prohibition zone S (FIG. 6).

Figure 8:
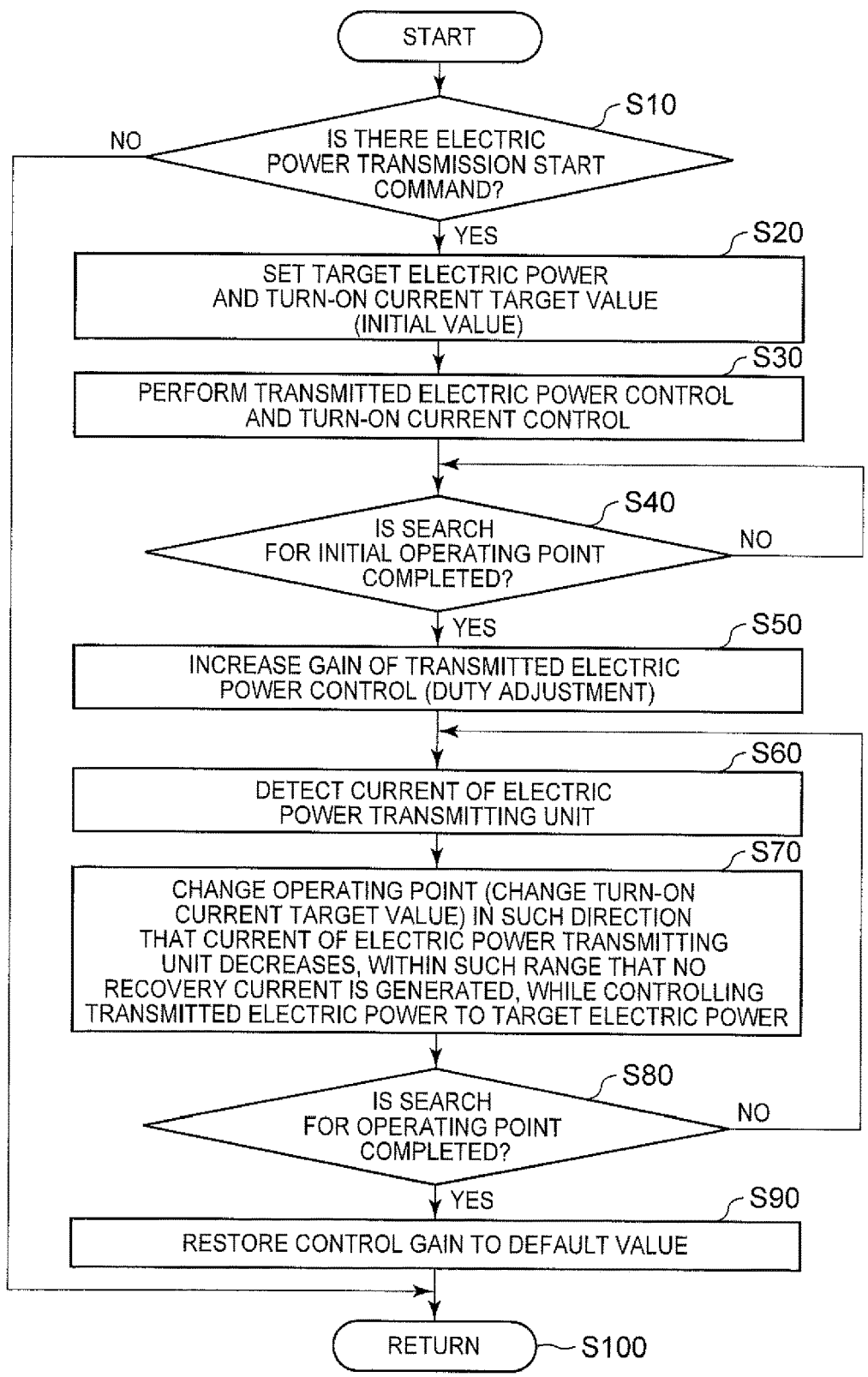
FIG. 8 is a flowchart for illustrating a process that is executed by the electric power supply ECU shown in FIG. 1 to search for an operating point of the inverter.

FIG. 8 is a flowchart for illustrating a process that is executed by the electric power supply ECU 250 shown in FIG. 1 to search for an operating point of the inverter 220. The process shown in this flowchart is called out from a main routine to be executed at intervals of a predetermined time or upon fulfillment of a predetermined condition.

Referring to FIG. 8, the electric power supply ECU 250 determines whether or not there is a command to start electric power transmission from the electric power transmitting device 10 to the electric power receiving device 20 (step S10). This electric power transmission start command may be based on a command by a user in the electric power transmitting device 10 or the electric power receiving device 20, or may be issued upon the arrival of a charging start time point through the use of a timer or the like. If there is no electric power transmission start command (NO in step S10), the electric power supply ECU 250 shifts the process to step S100 without executing a series of subsequent processing steps.

If it is determined in step S10 that there is an electric power transmission start command (YES in step S10), the electric power supply ECU 250 sets the target electric power Psr of the transmitted electric power Ps and the target value Itr (the initial value) of the turn-on current It (step S20). While the target electric power Psr is generated based on the electric power receiving situation of the electric power receiving device 20 as described above, the target electric power Psr is set to an initial value determined in advance at this time point when electric power transmission is not started. For example, 0 is set as the initial value of the turn-on current target value Itr.

When the target electric power Psr and the turn-on current target value Itr (the initial value) are set, the electric power supply ECU 250 performs transmitted electric power control and turn-on current control (step S30). When electric power transmission from the electric power transmitting device 10 to the electric power receiving device 20 is started as transmitted electric power control is performed, the target electric power Psr is corrected in accordance with the electric power receiving situation of the electric power receiving device 20. When the received electric power approaches the target value in the electric power receiving device 20, the target electric power Psr is also stabilized. The target electric power Psr and the turn-on current target value Itr (the initial value) at this time are equivalent to the operating point P0 shown in FIG. 6.

When transmitted electric power control and turn-on current control are started, the electric power supply ECU 250 determines whether or not the operating point of the inverter 220 has reached the initial operating point (the operating point P0 in FIG. 6) (step S40). Then, if it is determined that the operating point of the inverter 220 has reached the initial operating point (YES in step S40), the electric power supply ECU 250 makes the gain of transmitted electric power control (duty cycle adjustment) larger than a default value (a normal value) that has been valid until that time (step S50). Thus, the followability of the target value by transmitted electric power control is enhanced, and the search for the operating point can be carried out while controlling the transmitted electric power Ps to the target electric power Psr in an operating point search process that is executed in the following steps S60 to S80.

Subsequently, the electric power supply ECU 250 acquires a detected value of the current I1 flowing through the electric power transmitting unit 240, from the current sensor 274 (FIG. 1) (step S60). Then, the electric power supply ECU 250 changes the operating point of the inverter 220 in such a direction that the magnitude of the current I1 flowing through the electric power transmitting unit 240 decreases within a range in which no recovery current is generated in the inverter 220, while controlling the transmitted electric power Ps to the target electric power Psr (step S70). In concrete terms, after enhancing the followability of the target value by the transmitted electric power by increasing the gain of transmitted electric power control in step S50, the electric power supply ECU 250 changes the target value Itr of turn-on current control such that the magnitude of the current I1 flowing through the electric power transmitting unit 240 decreases, within a range in which no recovery current is generated in the inverter 220.

Subsequently, the electric power supply ECU 250 determines whether or not the search for the operating point of the inverter 220 is completed (step S80). A determination on the completion of this search can be made from various points of view. For example, it can be determined that the search for the operating point is completed when a minimum value of the current I1 is found, when the rate of decrease in the current I1 becomes smaller than a predetermined value, or when the turn-on current target value Itr reaches a predetermined lower limit, etc.

If it is determined in step S80 that the search for the operating point is not completed yet (NO in step S80), the electric power supply ECU 250 returns the process to step S60. Then, if it is determined in step S80 that the search for the operating point is completed (YES in step S80), the electric power supply ECU 250 restores the gain of transmitted electric power control changed in step S50 to the default value (the normal value) (step S90).

As described above, in this first embodiment, the target value Itr of turn-on current control is changed such that the current I1 flowing through the electric power transmitting unit 240 decreases within a range in which no recovery current is generated in the inverter 220, while controlling the transmitted electric power Ps to the target electric power Psr through transmitted electric power control. Thus, the efficiency of electric power transfer between the electric power transmitting unit 240 and the electric power receiving unit 310 can be enhanced within a range in which no recovery current is generated.

In the foregoing, the efficiency of electric power transfer between the electric power transmitting unit 240 and the electric power receiving unit 310 can be enhanced to the utmost within a range in which no recovery current is generated, by changing the target value Itr of turn-on current control such that the current I1 flowing through the electric power transmitting unit 240 is minimized.

[Second Embodiment] As described above, the turn-on current of the inverter 220 is controlled to a range in which no recovery current is generated in the inverter 220, and is basically controlled to a predetermined value equal to or smaller than 0. It should be noted herein that there are actually two operating points (drive frequencies) of the inverter 220 at which the turn-on current is the aforementioned predetermined value (e.g., 0) under the condition that the transmitted electric power is constant (which will be described later in detail). In this second embodiment, the one of the two operating points at which the current I1 flowing through the electric power transmitting unit 240 that is smaller is set as the initial operating point (an initial adjusted point of the drive frequency) in executing the process of activating the inverter 220.

Figure 9:
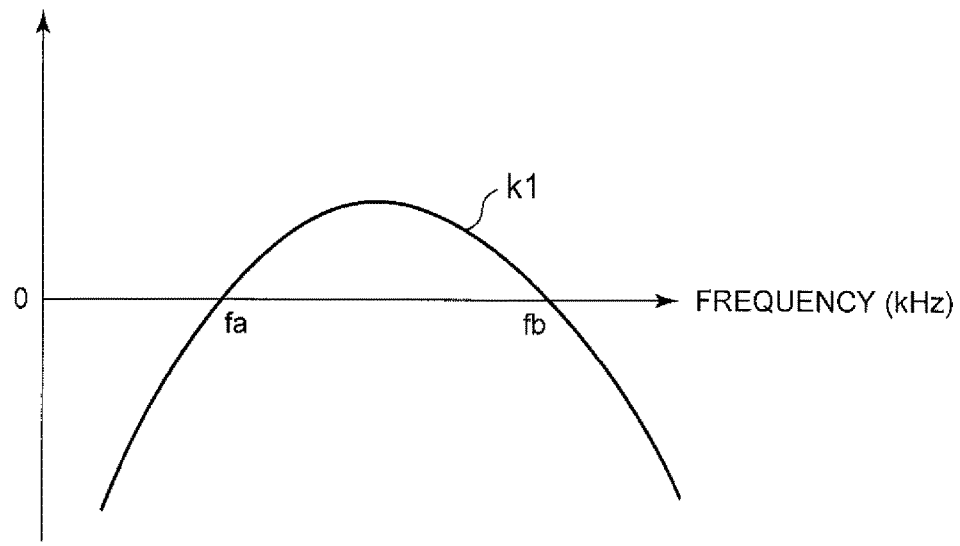
FIG. 9 is a view showing a relationship between turn-on current and drive frequency of the inverter under the condition that the transmitted electric power is constant.

FIG. 9 is a view showing a relationship between the turn-on current and the drive frequency of the inverter 220 under the condition that the transmitted electric power is constant. Referring to FIG. 9, the axis of abscissa represents the drive frequency of the inverter 220, and the axis of ordinate represents the turn-on current. A line k1 represents a turn-on current at the time when the drive frequency of the inverter 220 is changed, in the case where the transmitted electric power is constant. For instance, when the turn-on current is controlled to 0 (such a value that no recovery current is generated), there are two points fa and fb as the drive frequency of the inverter 220 at which the turn-on current is 0.

Figure 10:
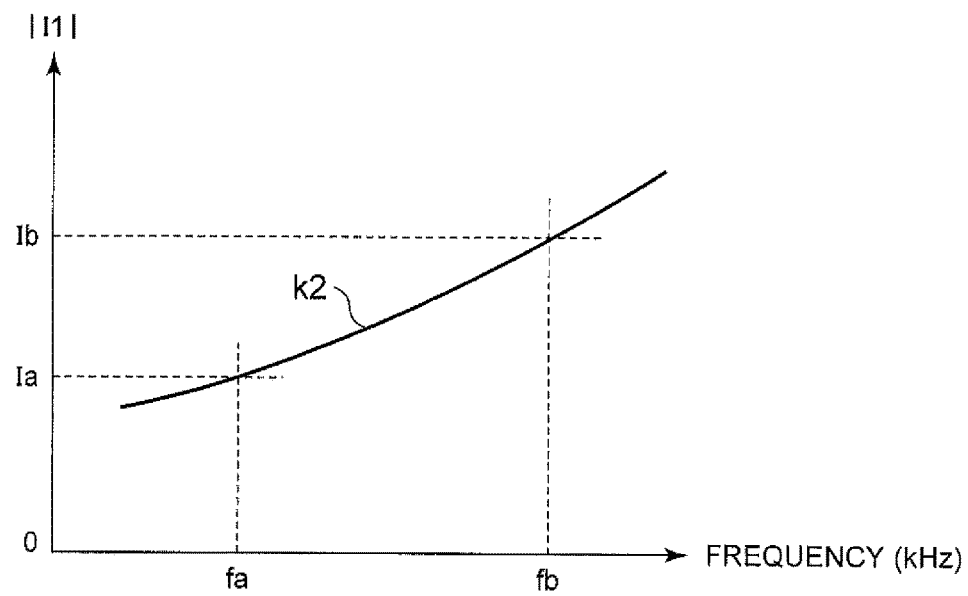
FIG. 10 is a view showing a relationship between current flowing through the electric power transmitting unit and drive frequency of the inverter under the condition that the transmitted electric power is constant.

FIG. 10 is a view showing a relationship between the current I1 flowing through the electric power transmitting unit 240 and the drive frequency of the inverter 220 under the condition that the transmitted electric power is constant. Referring to FIG. 10, the axis of abscissa represents the drive frequency of the inverter 220, and the axis of ordinate represents the magnitude of the current I1 flowing through the electric power transmitting unit 240. A line k2 represents a magnitude of the current I1 (e.g., an effective value of the current I1) at the time when the drive frequency of the inverter 220 is changed under the same condition as in FIG. 9. As described with reference to FIG. 9, the turn-on current is 0 at the frequencies fa and fb under the condition that the transmitted electric power assumes a certain constant value. However, the magnitude of the current I1 at the time when the frequency is fa is different from the magnitude of the current I1 at the time when the frequency is fb. In the example shown in this FIG. 10, a magnitude (Ia) of the current I1 at the time when the drive frequency of the inverter 220 is fa is smaller than a magnitude (Ib) of the current I1 at the time when the drive frequency is fb.

Thus, with the electric power transmitting device 10 according to this second embodiment, in the case where there are two points as the frequency at which the turn-on current is a predetermined value (e.g., 0) equal to or smaller than the limit value (the border of the prohibition zone S), the one of the aforementioned two frequencies at which the magnitude of the current I1 that is smaller (the frequency fa in the aforementioned example) is set as the initial adjusted value of the drive frequency in turn-on current control, in executing the process of activating the inverter 220.

As described with reference to FIG. 5, turn-on current control is designed to generate the drive frequency command value of the inverter 220 based on the deviation between the turn-on current target value Itr and the turn-on current It. Thus, for example, the drive frequency of the inverter 220 can be adjusted to the initial adjusted value fa by setting the drive frequency command value according to turn-on current control to the aforementioned frequency fa in executing the process of activating the inverter 220.

Figure 11:
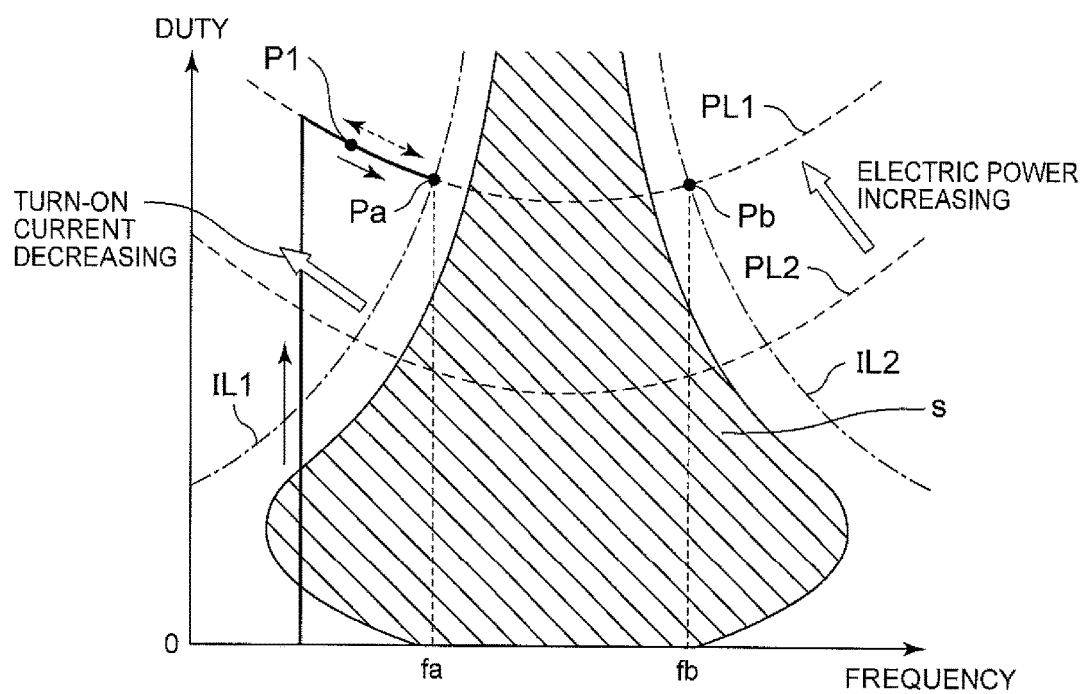
FIG. 11 is a view showing exemplary contour lines of transmitted electric power and turn-on current.

FIG. 11 is a view showing exemplary contour lines of the transmitted electric power Ps and the turn-on current It. Referring to FIG. 11, this FIG. 11 corresponds to FIG. 6 described in the first embodiment. The line IL1 described in FIG. 6 as well is a contour line on which the turn-on current is 0. However, there is actually another contour line on which the turn-on current assumes the same value, in a region on the other side across the prohibition zone S, as indicated by the line IL2 (not shown or described in FIG. 6).

Then, an operating point Pa that is prescribed by the intersection point of the line PL1 representing the contour line of the transmitted electric power Ps and the line IL1 is equivalent to the operating point at the frequency fa described with reference to FIGS. 9 and 10. An operating point Pb that is prescribed by the intersection point of the line PL1 and the line IL2 is equivalent to the operating point at the frequency fb described with reference to FIGS. 9 and 10.

If the turn-on current is controlled to a predetermined target value (e.g., 0) while realizing the transmitted electric power Ps, both the operating points Pa and Pb can be selected as the initial target value of the operating point of the inverter 220. In this second embodiment, the operating point Pa (the drive frequency fa), namely, the one of the operating points Pa and Pb at which the magnitude of the current I1 flowing through the electric power transmitting unit 240 that is smaller is selected as the initial target value of the operating point of the inverter 220. That is, in this second embodiment, the frequency fa, namely, the one of the drive frequencies fa and fb of the inverter 220 at which the magnitude of the current I1 that is smaller is set as the initial adjusted value of the drive frequency of the inverter 220, in executing the process of activating the inverter 220. Then, the target value Itr of turn-on current control is changed such that the magnitude of the current I1 flowing through the electric power transmitting unit 240 decreases, with the operating point Pa (the frequency fa) serving as a point of origin.

Figure 12:
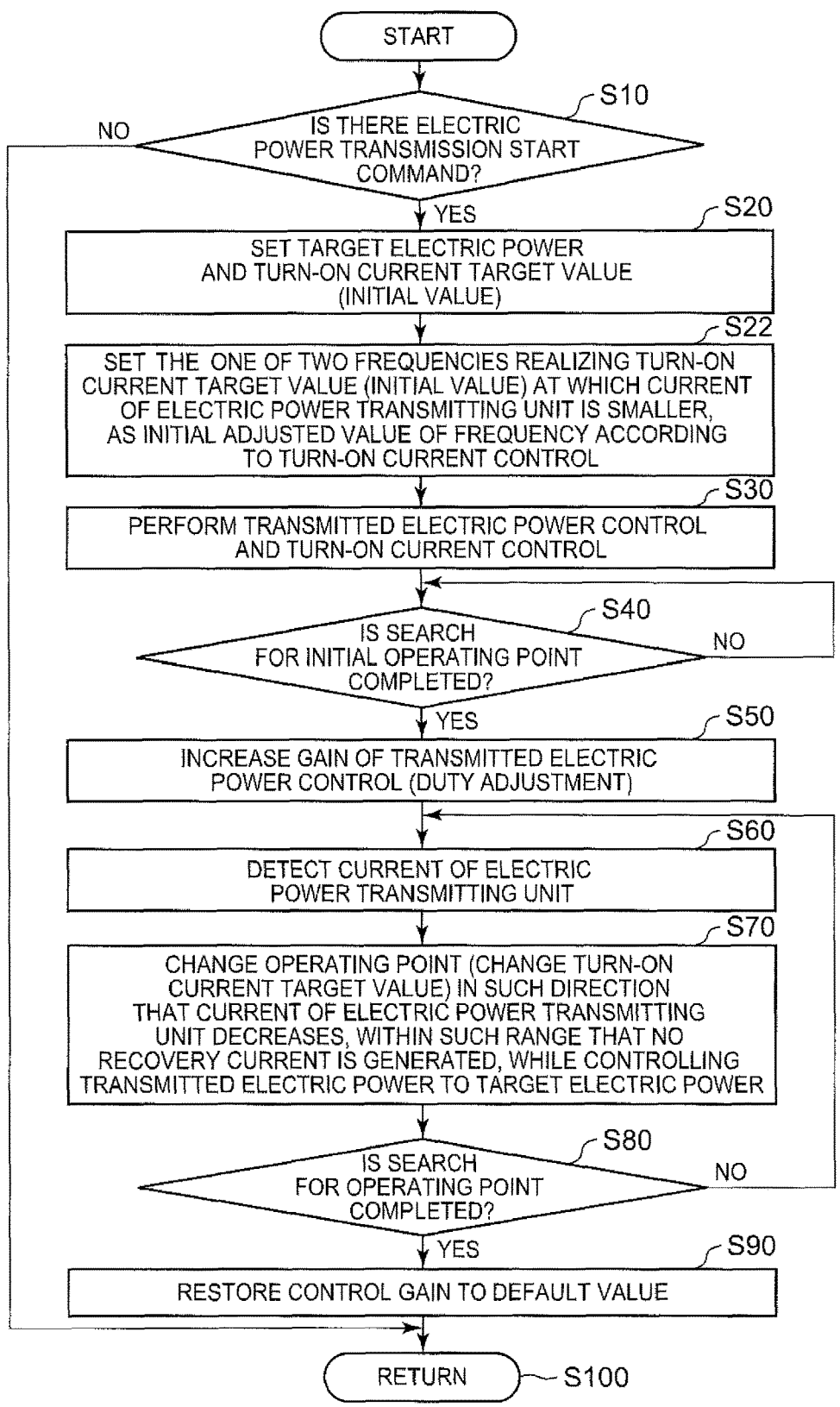
FIG. 12 is a flowchart for illustrating a process that is executed by an electric power supply ECU in a second embodiment to search for an operating point of an inverter.

FIG. 12 is a flowchart for illustrating a process that is executed by the electric power supply ECU 250 in the second embodiment to search for an operating point of the inverter 220. The process shown in this flowchart is also called out from a main routine to be executed at intervals of a predetermined time or upon fulfillment of a predetermined condition.

Referring to FIG. 12, this flowchart further includes step S22 in the flowchart in the first embodiment shown in FIG. 8. That is, when the target electric power Psr and the turn-on current target value Itr (the initial value) are set in step S20, the electric power supply ECU 250 selects the one of two drive frequencies (e.g., the frequencies fa and fb in FIGS. 9 and 10) realizing the turn-on current target value Itr (the initial value) at which the magnitude of the current I1 flowing through the electric power transmitting unit 240 that is smaller (e.g., the frequency fa in FIGS. 9 and 10). Then, the electric power supply ECU 250 sets the selected frequency as the initial adjusted value of the frequency according to turn-on current control (step S22).

After that, transmitted electric power control and turn-on current control are performed in step S30, and a search for the initial operating point is carried out. In concrete terms, transmitted electric power control and turn-on current control are performed toward the operating point at which the transmitted electric power Ps is equal to the target electric power Psr (the operating point Pa in FIG. 11), at the one of the two drive frequencies (fa and fb) realizing the target electric power Psr and the turn-on current target value Itr (the initial value) at which the magnitude of the current I1 that is smaller, namely, at the frequency (fa).

The respective processing steps starting from step S30 are executed as described with reference to FIG. 8. As described above, in this second embodiment, the drive frequency of the inverter 220 is adjusted to the one of the two drive frequencies realizing the target electric power Psr and the turn-on current target value Itr (the initial value) at which the magnitude of the current I1 flowing through the electric power transmitting unit 240 is smaller, in executing the process of activating the inverter 220. Then, the target value Itr of the turn-on current is changed such that the magnitude of the current I1 decreases, within a range in which no recovery current is generated in the inverter 220. Thus, the current I1 flowing through the electric power transmitting unit 240 can be promptly reduced after the inverter 220 is activated. In consequence, according to this second embodiment, the efficiency of electric power transfer can be promptly enhanced within a range in which no recovery current is generated, after the inverter 220 is activated.

[Modification Examples] In each of the aforementioned first and second embodiments, the operating point is changed (the turn-on current target value is changed) such that the magnitude of the current I1 flowing through the electric power transmitting unit 240 decreases within a range in which no recovery current is generated in the inverter 220, while controlling the transmitted electric power to the target electric power. However, the output current Io of the inverter 220 may be used instead of the current I1. That is, the operating point may be changed (the turn-on current target value may be changed) such that the magnitude of the output current Io of the inverter 220 decreases within a range in which no recovery current is generated, while controlling the transmitted electric power to the target electric power.

Figure 13:
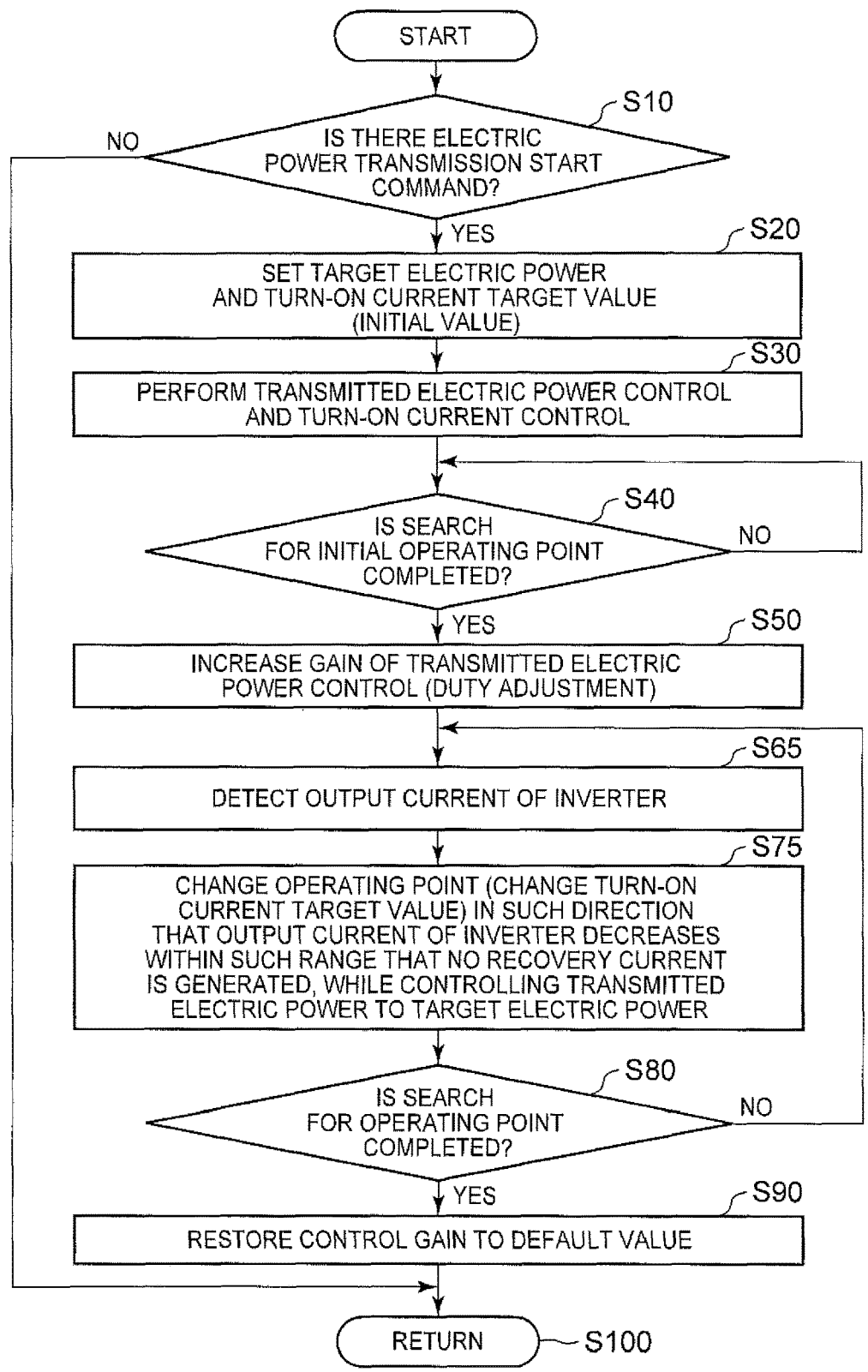
FIG. 13 is a flowchart for illustrating a process that is executed by an electric power supply ECU in a modification example of the first embodiment to search for an operating point of an inverter.

FIG. 13 is a flowchart for illustrating a process that is executed by the electric power supply ECU 250 in the modification example of the first embodiment to search for an operating point of the inverter 220. The process shown in this flowchart is also called out from a main routine to be executed at intervals of a predetermined time or upon fulfillment of a predetermined condition.

Referring to FIG. 13, this flowchart includes steps S65 and S75 instead of steps S60 and S70 in the flowchart shown in FIG. 8. That is, when the gain of transmitted electric power control (duty cycle adjustment) is increased in step S50, the electric power supply ECU 250 acquires a detected value of the output current Io of the inverter 220 from the current sensor 272 (FIG. 1) (step S65).

Then, the electric power supply ECU 250 changes the operating point of the inverter 220 in such a direction that the magnitude of the output current Io decreases within a range in which no recovery current is generated in the inverter 220, while controlling the transmitted electric power Ps to the target electric power Psr (step S75). In concrete terms, after enhancing the followability of the target value by the transmitted electric power by increasing the gain of transmitted electric power control in step S50, the electric power supply ECU 250 changes the target value Itr of turn-on current control such that the magnitude of the output current Io of the inverter 220 decreases, within a range in which no recovery current is generated in the inverter 220.

After that, the process is shifted to step S80, and it is determined whether or not the search for the operating point of the inverter 220 is completed. The respective processing steps starting from step S80 are executed as described with reference to FIG. 8.

Figure 14:
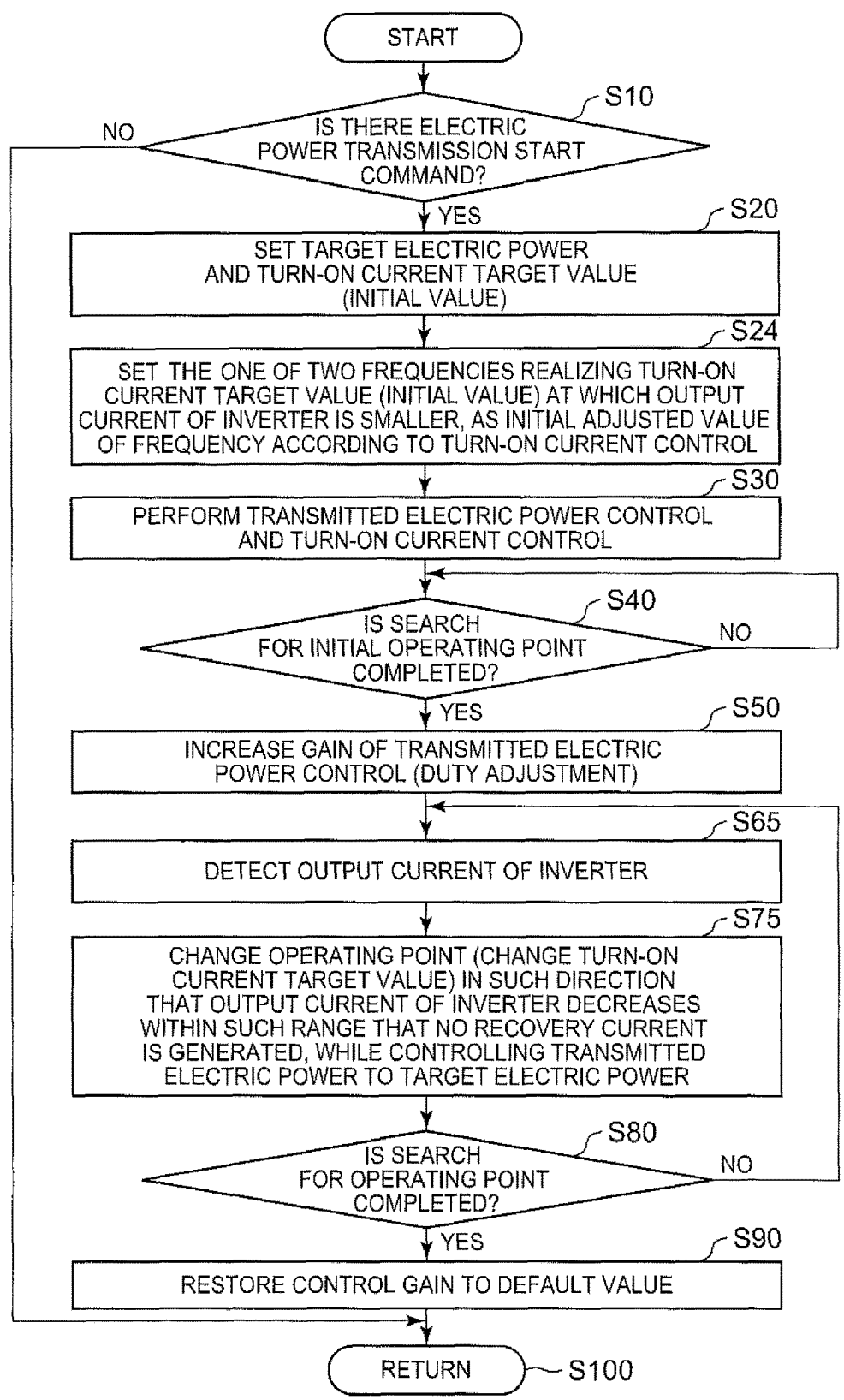
FIG. 14 is a flowchart for illustrating a process that is executed by an electric power supply ECU in a modification example of the second embodiment to search for an operating point of an inverter.

FIG. 14 is a flowchart for illustrating a process that is executed by the electric power supply ECU 250 in the modification example of the second embodiment to search for an operating point of the inverter 220. The process shown in this flowchart is also called out from a main routine to be executed at intervals of a predetermined time or upon fulfillment of a predetermined condition.

Referring to FIG. 14, this flowchart includes steps S24, S65 and S75 instead of steps S22, S60 and S70 in the flowchart shown in FIG. 12. That is, when the target electric power Psr and the turn-on current target value Itr (the initial value) are set in step S20, the electric power supply ECU 250 selects the one of the two drive frequencies realizing the turn-on current target value Itr (the initial value) at which the magnitude of the output current Io of the inverter 220 is smaller. Then, the electric power supply ECU 250 sets the selected frequency as the initial adjusted value of the frequency according to turn-on current control (step S24).

After that, transmitted electric power control and turn-on current control are performed in step S30, and an initial operating point is searched for.

When the gain of transmitted electric power control (duty cycle adjustment) is increased in step S50, the output current lo of the inverter 220 is detected in step S65. Then in step S75, the operating point of the inverter 220 is changed in such a direction that the magnitude of the output current 10 decreases within a range in which no recovery current is generated in the inverter 220, while controlling the transmitted electric power Ps to the target electric power Psr. The respective processing steps starting from step S30 are executed as described with reference to FIG. 13.

As described above, an operation and an effect similar to those of the first embodiment are obtained by the modification example of the first embodiment as well. An operation and an effect similar to those of the second embodiment are obtained by the modification example of the second embodiment as well.

In the foregoing, the electric power supply ECU 250 corresponds to an example of "the electronic control unit". Transmitted electric power control corresponds to "the first control", and turn-on current control corresponds to "the second control".

Appropriate combinations of the respective embodiments disclosed herein are also contemplated. Moreover, the embodiments should be considered to be exemplary and nonrestrictive in all respects.

Following is a summary of the embodiments. An electric power supply ECU 250 performs transmitted electric power control for controlling a transmitted electric power to a target electric power by adjusting a duty cycle of an output voltage of an inverter 220, and turn-on current control for controlling a turn-on current to a target value by adjusting a drive frequency of the inverter 220. The target value of the turn-on current is set within a range in which no recovery current is generated in a recirculation diode of the inverter 220. The electric power supply ECU 250 changes the target value of the turn-on current such that a magnitude of a current flowing through an electric power transmitting unit 240 decreases within the range in which no recovery current is generated, while controlling the transmitted electric power to the target electric power through transmitted electric power control.

The invention claimed is:

1. A non-contact electric power transmitting device configured to transmit an electric power to an electric power receiving device in a non-contact manner, the non-contact electric power transmitting device comprising:
   an electric power transmitting unit;
   a voltage inverter configured to supply a transmitted electric power having a drive frequency, the transmitted electric power to be transmitted to the electric power receiving device by the electric power transmitting unit; and
   an electronic control unit configured to control the inverter, the electronic control unit being configured to perform;
   i) a first control that controls the transmitted electric power to a target electric power by adjusting a duty cycle of an output voltage of the inverter,
   ii) a second control that controls a turn-on current representing an output current of the inverter by adjusting the drive frequency, the output current being an output current at a time when the output voltage rises,
   iii) adjusting the duty cycle and the drive frequency such that a current supplied from the inverter to the electric power transmitting unit decreases within a range in which the turn-on current is equal to or smaller than a limit value, while controlling the transmitted electric power to the target electric power through the first control, and
   iv) as a result of the electronic control unit determining if there are two drive frequencies at which the turn-on current is a predetermined value equal to or smaller than the limit value under a condition that the electric power to be transmitted is constant, the electronic control unit sets one of the two drive frequencies at which a magnitude of the current supplied from the inverter to the electric power transmitting unit is smaller, as an initial adjusted value of the drive frequency in the second control, in executing a process of activating the inverter.

2. The non-contact electric power transmitting device according to claim 1, wherein
   the electronic control unit is configured to adjust the duty cycle and the drive frequency such that the current supplied from the inverter to the electric power transmitting unit is minimized within the range in which the turn-on current is equal to or smaller than the limit value, while controlling the transmitted electric power to the target electric power through the first control.

3. An electric power transfer system comprising:
   an electric power transmitting device; and
   an electric power receiving device,
   wherein the electric power transmitting device includes;
   an electric power transmitting unit configured to transmit an electric power to the electric power receiving device in a non-contact manner,
   a voltage inverter configured to supply a transmitted electric power having a drive frequency, the transmitted electric power to be transmitted to the electric power receiving device by the electric power transmitting unit, and
   an electronic control unit configured to control the inverter, the electronic control unit being configured to perform;
   i) a first control that controls the transmitted electric power to a target electric power by adjusting a duty cycle of an output voltage of the inverter,
   ii) a second control that controls a turn-on current representing an output current of the inverter by adjusting the drive frequency, the output current being an output current at a time when the output voltage rises,
   iii) adjusting the duty cycle and the drive frequency such that a current supplied from the inverter to the electric power transmitting unit decreases within a range in which the turn-on current is equal to or smaller than a limit value, while controlling the transmitted electric power to the target electric power through the first control, and
   iv) as a result of the electronic control unit determining if there are two drive frequencies at which the turn-on current is a predetermined value equal to or smaller than the limit value under a condition that the electric power to be transmitted is constant, the electronic control unit sets one of the two drive frequencies at which a magnitude of the current supplied from the inverter to the electric power transmitting unit is smaller, as an initial adjusted value of the drive frequency in the second control, in executing a process of activating the inverter.

4. The electric power transfer system according to claim 3, wherein the electronic control unit is configured to adjust the duty cycle and the drive frequency such that the current supplied from the inverter to the electric power transmitting unit is minimized within the range in which the turn-on current is equal to or smaller than the limit value, while controlling the transmitted electric power to the target electric power through the first control.

* * * * *